UNITED STATES PATENT OFFICE.

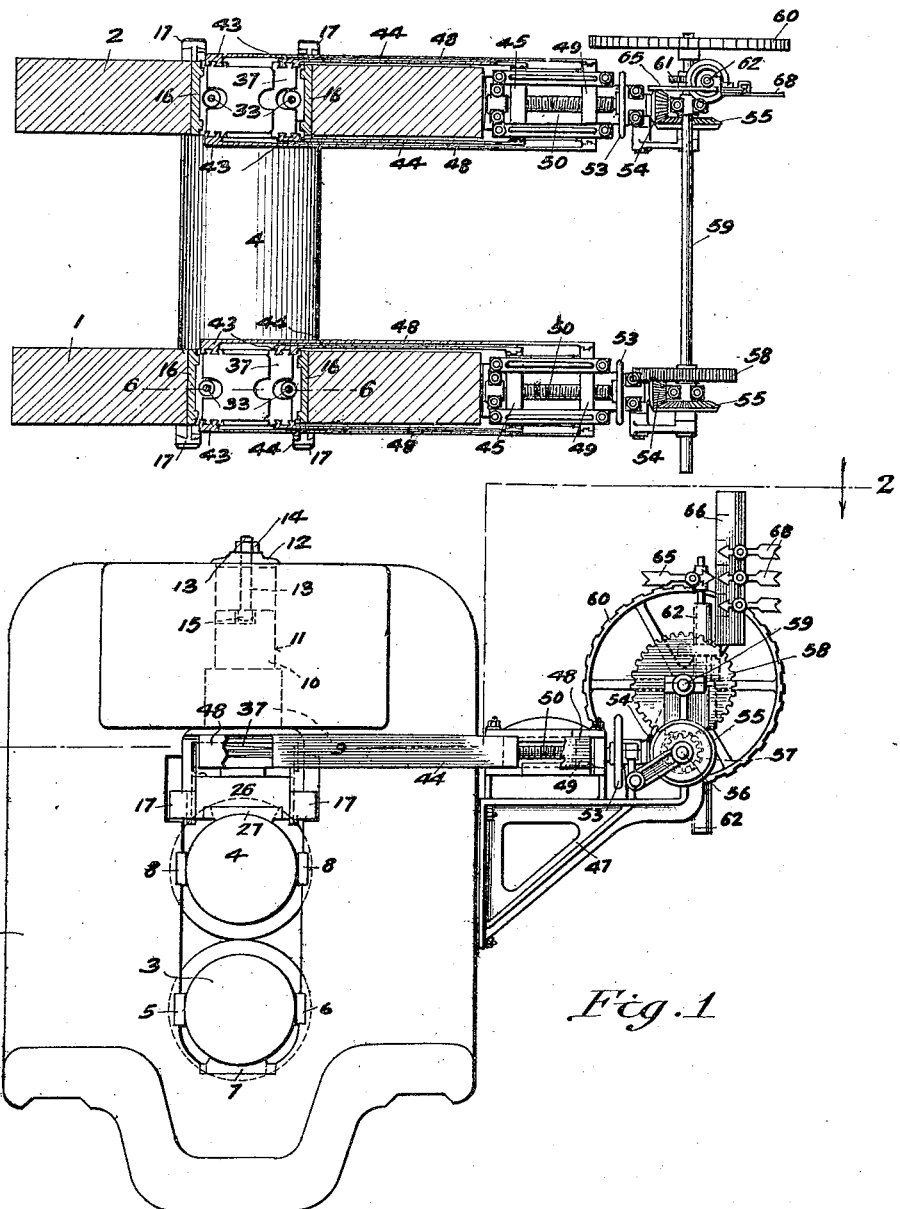

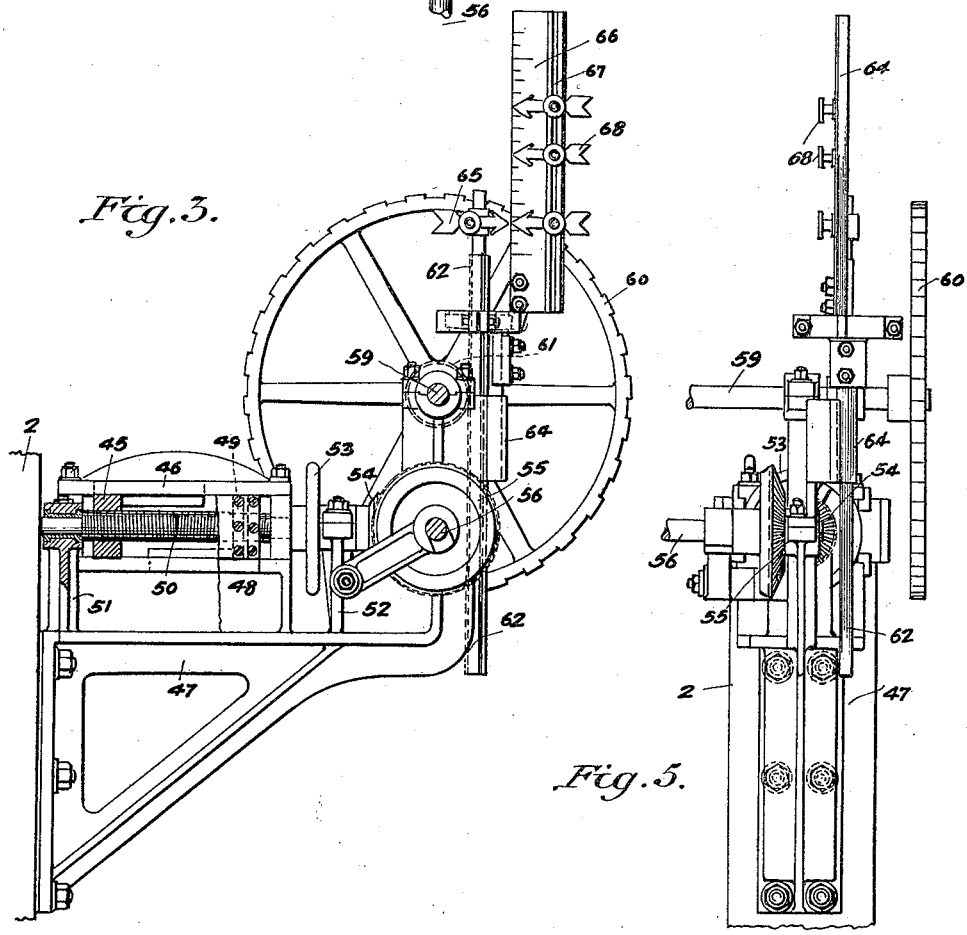

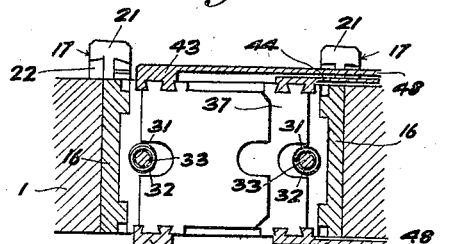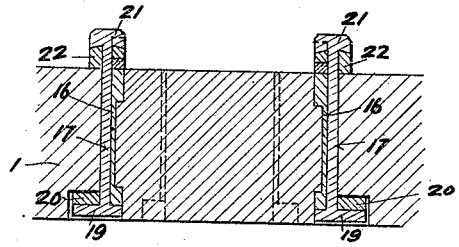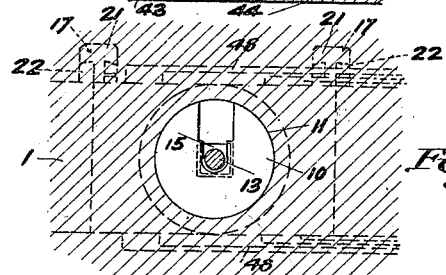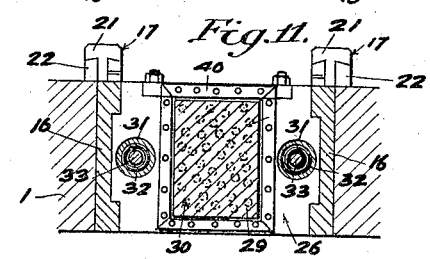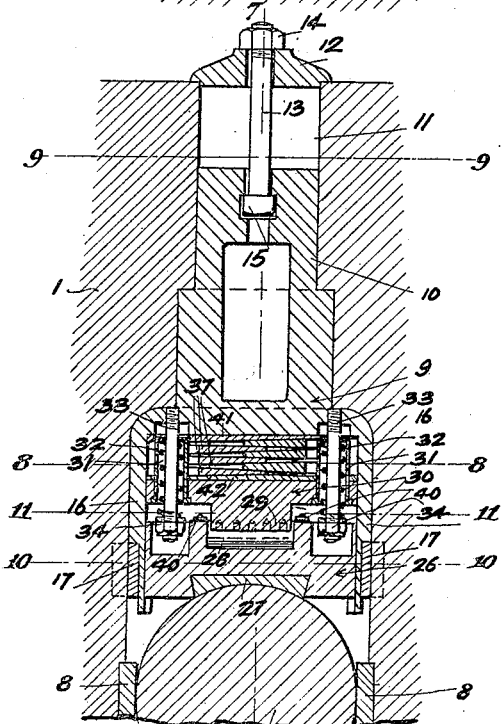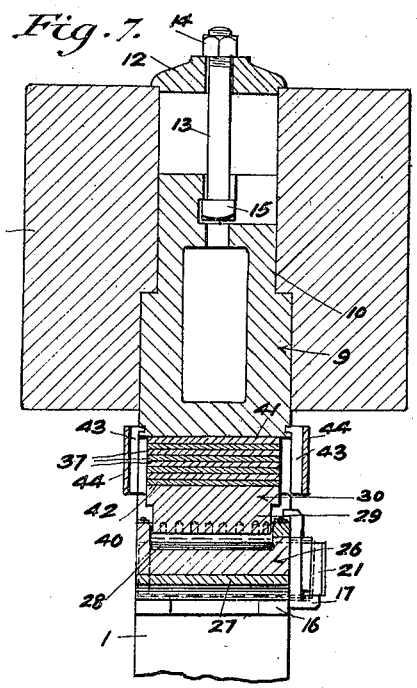

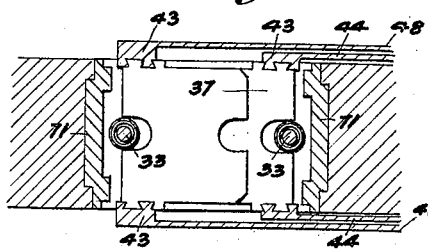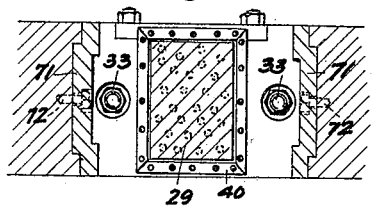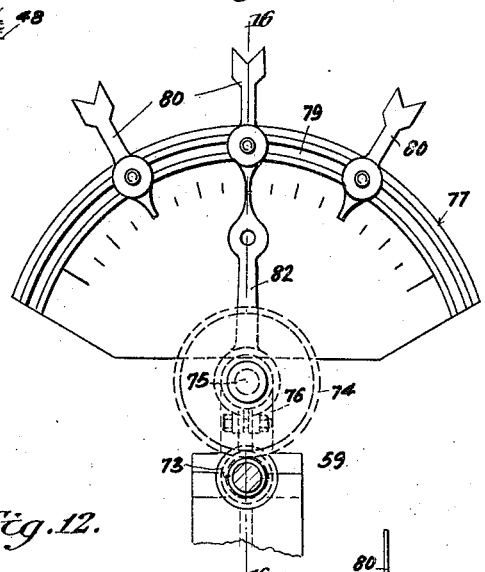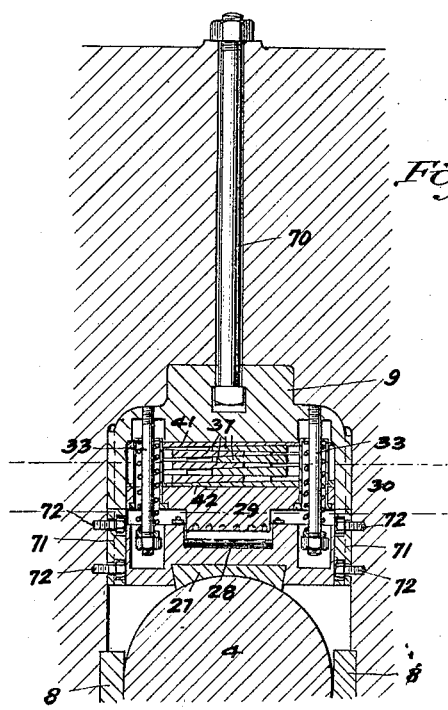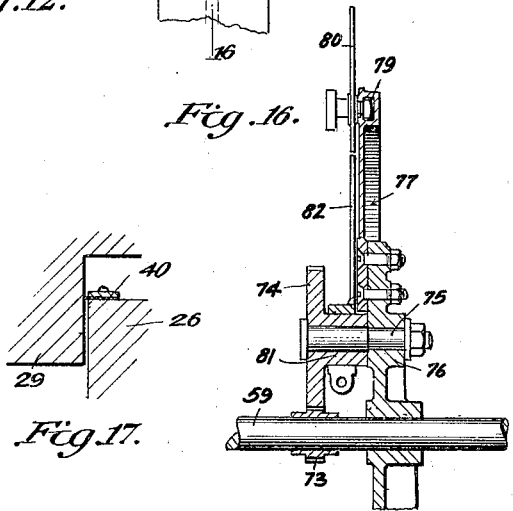

JOHN N. QUINN, OF CINCINNATI, OHIO.

ROLLING-MILL BEARING.

1,405,438.      Specification of Letters Patent.     Patented Feb. 7, 1922.

Application filed January 15, 1920. Serial No. 351,718.

*To all whom it may concern:*

Be it known that I, JOHN N. QUINN, a citizen of the United States, and residing at Cincinnati, in the county of Hamilton and State of Ohio, have invented a new and useful Improvement in Rolling-Mill Bearings, of which the following specification is a full disclosure.

My invention relates to an improvement in journal bearings particularly adaptable for rolling mills of the "jump mill" type, in which one of the rolls is movable within its housing and separated from its companion roll by the work as thrust or inserted between the rolls.

One of the objects of the invention is to provide a bearing abutment for one of the rolls of a rolling mill, which is very substantial in construction to withstand for a long period heavy thrust-blows or pressure imparted thereto by the rolls in starting and rolling the work between the rolls.

Another object of the invention is to provide extensible bearings for the journal of one roll of a pair of companion rolls of a rolling mill for quickly, easily and accurately controlling and regulating the degree of roll separation, whereby the work can be uniformly rolled to a definite gauge thickness, or for producing products of different dimensions by the continuous operation of the same mill, or for progressively changing or reducing the dimension of a piece of work by successive passes between the rolls.

Another object of the invention is to provide an extensible journal bearing in which the extension is produced by tapering plates oppositely disposed and centrally overlapped to provide a laminated wall between the movable bearing member and rigid abutment.

Another object of the invention is to provide an extensible journal bearing with simple and effective operating mechanism for extending and contracting the bearing and for micrometrically indicating the degree of bearing extension.

Other features and objects of the invention will be more fully set forth in the detail description of the accompanying drawings, forming a part of this specification, and in the drawings like characters of reference denote corresponding parts throughout the several views, of which:

Fig. 1 is a side elevation of a rolling mill, illustrating my improved extensible bearing mechanism for operating the same, and for quickly and definitely adjusting and limiting the degree of roll separation of a rolling mill as applied to the ordinary housings of mills in use.

Fig. 2 is a horizontal section of the same taken on the line 2—2 of Fig. 1.

Fig. 3 is an enlarged detail side elevation of that portion of the mechanism pertaining to the dial and its correlated parts.

Fig. 4 is a top plan view of the same.

Fig. 5 is an end view of the structure shown in Fig. 3.

Fig. 6 is an enlarged detail vertical section on the line 6—6, of Fig. 2, illustrating one side of the abutment means for the upper roll, each side of the said abutment means being similar in construction.

Fig. 7 is a vertical sectional view on the line 7—7 of Fig. 6.

Figs. 8, 9, 10 and 11 are respectively horizontal sections on lines 8—8, 9—9, 10—10 and 11—11 of Fig. 6.

Fig. 12 is a view similar to Fig. 6, showing a modification of my mechanism.

Figs. 13 and 14 are respectively horizontal sections on the lines 13—13 and 14—14 of Fig. 12.

Fig. 15 is an enlarged face view of a modified form of dial and indicating mechanism.

Fig. 16 is a vertical section therethrough on the line 16—16.

Fig. 17 is an enlarged detail section of a portion of the lower member of the extensible bearing or bearing abutment and bearing block of the dash-pot arrangement between said member and packing therefor.

The housings or journal frames 1, 2, shown in Figs. 1 and 2 for the pair of rolls 3, 4, are representative of the housings of a commercial type of rolling mill, known as a "jump mill," wherein the upper roll is movably mounted within its housing and normally rests upon the lower roll and moved upwardly by the work or material to be rolled when inserted or thrust between the rolls.

The housings of such types of rolling mills each have a central vertical bore for the reception of a nut and screw providing an adjustable abutment against which bearing blocks, carried by the upper roll and slidable within the housing, engage or strike to limit the upward thrust of the roll when the work is inserted and thrust between the rolls, determining the degree of roll separation, which degree of roll separation accordingly determines the gauged thickness of the rolled material.

The journal ends of the lower roll are supported upon and journaled between stationary bearing blocks or shoes mounted within the housings. As the upper roll is forced upwardly with each insertion of the work between the rolls, heavy thrust-blows are repeatedly imparted to the screws and their nuts, destroying their accuracy of adjustment and subtility, necessitating frequent renewal of the parts. Renewal sometimes is very difficult, as the nut and screw are swaged together and within the bore or socket in the housing.

In Figs. 1 to 8 inclusive my invention is shown as applicable within the housings of rolling mills in use, replacing the old screw and nut type of adjustable abutment means for the journals of the upper roll. Referring to these figures, 1, 2, indicate a pair of opposite housings or journal frames which may be mounted in the ordinary way upon a base rail or bed, not shown. Each housing is provided with a central vertical opening therethrough to receive the journal ends of the pair of rolls 3, 4. As the construction of the housings, roll bearings and adjusting means for the bearings, within the housing, for the opposite journal ends of the rolls, are the duplicates of each other, the detail description of the parts will be made in the singular in so far as is possible.

The lower roll 3 has its journal ends engaged and bearing between a pair of oppositely disposed bearing blocks or shoes 5, 6, mounted within the recesses in the housings and supported and journaled upon a base block or shoe 7, likewise seated and secured within a recess in the housing. The upper roll is engaged at opposite sides between opposite guide bearing blocks 8, 8, mounted respectively within recesses formed in the housing. These blocks 8, 8, have a plane face, against which the journal of the upper roll bears to guidingly sustain the roll in its vertical motions as the work is inserted between and discharged from the rolls.

An abutment frame 9 is mounted within the journal opening of the housing above the upper roll, shaped to conform with the upper end of the opening, thus having a shouldered engagement with the housing, and provided with an upwardly extending cylindrical boss or hub 10 engaged within the bore 11 centrally through the upper end of the housing.

This frame 9 is secured within the housing by means of a cap plate 12 countermilled to engage into the upper end of the housing bore and seat upon the upper surface of the housing, securely anchoring the cap plate 12 in position. A bolt 13 passes centrally through the cap plate with its upper end engaged therewith by means of a nut 14, and the head end 15 of the bolt is connected to the upper end of the boss 10 of the frame 9. The connection is such as to provide for convenient insertion and removal of the bolt. The frame 9 is provided at its opposite side with depending guide limbs 16, 16, bearing against the side walls of the housing journal opening. The limbs 16 are clamped and anchored within the housing by means of cross plates 17, each plate having flanged heads at its opposite ends, as of I-beam construction shown in Fig. 10, the flanged end or head 19 engaging into a recess in the housing and bearing against a shim-block 20. The opposite flanged head 21 of the clamp or cross plate 17 is engaged on one side of the web portion of the plate 17 by a shim-block 22 inserted between the flanged head 21 and the side face of the housing. This provides means for securely tying or clamping the guide limbs within the housing against lateral strains or thrusts which may be imparted thereto in starting or passing the work between the rolls, as the bearing block 26 is guidingly mounted within ways formed in said wings and resting upon the upper side of the end journal of the upper roll 4.

The bearing block 26 is provided with a shoe insert 27, which engages the upper side of the journal of the roll 4, the shoe forming a journal bearing for the upper roll when the upward pressure is brought to bear upon it in the act of rolling. The bearing block 26 is provided with a central recess or pocket 28 to receive the plunger or piston end 29 of the adjustable bearing abutment block 30 suspendingly mounted from the abutment member 9. The adjustable abutment block 30 is provided at its opposite sides with a pair of sleeves or thimbles 31 having annularly flanged heads recessed into the lower side of the block 30 and providing a housing for a spring 32 encircling a bolt 33, screw threaded and engaged into the abutment frame 9 and extended concentrically through the sleeve 31 for yieldingly suspending the abutment block 30 from the abutment frame 9. One end of the spring 32 engages against the flanged end of the sleeve or thimble 31, and the opposite end of the spring engages against a washer and nut 34, threaded upon the end of the bolt 33, thereby drawing the block 30 against the intermediate adjusting plates and toward the frame 9 unitarily combining the parts and as a unit providing an extensible abutment for the bearing block of the upper roll.

A plural series of oppositely disposed wedge-plates 37 are arranged in a superposed and alternate relation between the end of the abutment frame 9 and the abutment block 30 for adjusting or raising or lowering the abutment block 30 and correspondingly regulating the limit of upward motion of the bearing block 26 and its roll 4, and thereby regulating the degree of roll sparation which governs the gauge thickness of work passed between the rolls.

The plunger end 29 of the abutment block 30 has its face provided with a series of recesses as clearance interstices for pocketing the cushioning liquid or fluid within the pocket or chamber 28 of the bearing block 26.

A packing 40 is secured upon the bearing block 26, around its pocket or chamber opening bearing against walls of the plunger for confining the cushioning fluid within the chamber when the plunger and journal block 26 are forced together by the upward thrust of the upper roll, when inserting between the rolls the material to be rolled. The recesses are proportioned to provide a capacity for approximately the entire volume of fluid within the chamber, permitting the fluid to be displaced from the chamber as the plunger is compressed into the chamber and allow the head of the plunger to contact directly with the bearing below, operating as a dash-pot to take up the strains initially, cushioning the thrusts as the parts are brought together. This dash-pot arrangement, however, is designed solely for the purpose of relieving the parts of sudden shocks or strains without altering or destroying the degree of a definite setting, for which the parts have been adjusted to produce a predetermined degree of roll separation. The wedge plates in a plural number are superposed upon each other in alternate arrangement and are each provided with a slight degree of angle or taper. The angle or taper is considerably less than any angle of friction which may cause any outward spreading or lateral influence of the plates on one another under the pressure of the upward thrust of the roll or pressure transverse to the adjustment of the plate, and receive the roll thrusts substantially as if they were plane flat plates. They furnish a comparatively large area, providing a very substantial abutment which cannot be readily injured by the repeated upward thrusts of the upper roll. The wedge or adjusting plates of each set are moved simultaneously as a unit and the sets relatively in opposing directions toward and from each other for effecting the necessary adjustment required for roll abutment limits.

With the wedge or tapered adjusting plates arranged in opposing sets of a plural number to each set superposed and in an alternate or staggered relation, the degree of extension, measured perpendicular to the plane in which the plates are adjusted, is compounded by the opposing plates as they slide upon one another through. Thus a substantial degree of extension or contraction is produced by a comparatively slight degree of plate adjustment. A small degree of angle provides free and easy adjustment of the plates and setting to micrometric precision.

The plates as units thus require but slight adjustment to change the degree of roll separation from one setting to a second or successive setting for making repeated passes of the work through the mill for its reduction in gauge thickness. It is desirable in many instances to make three successive passes of the work through the mill with the roll separation adjusted for each pass, so that convenience, speed and accuracy of adjustment is quite an essential factor. Bearing plates 41, 42, are respectively interposed between the adjusting plates and stationary abutment member 9 and adjusting plates and movable abutment member 30, each having one side surface plane or straight, and the opposite side angled or inclined, the straight surface of each bearing against a respective adjacent abutment member and the inclined surfaces thereof cooperating with the respective adjacent adjusting plates. These bearing plates are guidingly engaged in the ways formed in the depending limbs of the stationary abutment member 9.

With the opposite faces or surfaces of the adjusting plates of a reduced degree of taper or incline, they can withstand a very heavy pressure transversely to their line or plane of adjustment without disturbing their adjustment setting and being adjusted in a direction lateral to the axis of the roll, provided an elongated area of overlap of the several plates as a laminated wall extending parallel with the roll axis and central thereto or in a line vertically diametrically through the roll axis and of a length approximately equal to the length of the roll journals within the housings. The springs yieldingly clamp the adjustable or movable abutment member and plates to the stationary abutment member under a sufficient pressure to prevent any vibration or separation of the parts as the roll and its bearing block descend after the work has passed from between the rolls, avoiding any possible chatter or hammer of the plates upon one another, which may injure their surfaces or destroy the plates. The plates are duplicates of each other and bear no distinction as to the rights and lefts and are easily and conveniently assembled in their position between the abutment members. The plates are also dimensioned to provide for a definite area of overlap upon each other at their maximum degree of outward adjustment, thereby establishing a minimum wall thickness between the abutment members at the greatest degree of roll separation for a given size of mill, which wall thickness materially increases as the abutment extension alignments are made.

Thus as the plates occupy their normal contracted position, the rolls have a maximum degree of separation which is generally for the first pass of the plate, slab or billet when the metal is highly heated and more malleable and susceptible to compression, so that the upward pressure of the roll is not as severe as for the subsequent passes as the metal cools and resists compression. With each adjustment of the plates of the opposing unit progressively toward each other, reducing the degree of separation, the area of overlap of the plates is increased, thus progressively increasing the laminated wall thickness formed by the plates as the upward pressure of the roll is increased, which is of material advantage in maintaining the accuracy of adjustment and life of the parts, so that an operator who has acquired skill in visual gauging need not be necessarily employed.

And with a mill provided with the indicator mechanism, hereinafter described, legibly showing the degree of roll separation for each adjustment of the plates or extensible bearing, the operator is perceptibly guided not only as to the degree of adjustment required for each pass, but also directed as to the order and number of passes made or to be made. The bearing parts are subjected only to a minimum amount of wear for an extended period of mill operation and frequent adjustment of the indicator mechanism to maintain its reading accuracy is eliminated.

The adjusting plates of one set or unit, each at their opposite sides, are provided with dove-tailed extensions or teeth engaging respectively with corresponding grooved heads 43, 43, of a pair of limbs 44, 44, arranged at opposite sides of the housing. The limbs 44, 44 are fixed to a cross-head 45, guided and slidable in the guide frame 46, of the bracket 47, fixed to and projecting from the housing. The adjusting plates of the opposite or second set or unit are similarly engaged into the grooved heads of the links 48, 48, at opposite sides of the housing and connected to a cross-head 49 slidable within the frames 46.

The cross-heads 45, 49, are engaged respectively by the right and left hand screw portions of the screw shaft 50, journaled at its opposite ends in the journal extensions 51, 52, projecting upwardly from the bracket 47. The screw is provided with a hand-wheel 53 for manually rotating the screw for feeding the cross-heads in a forward or reverse direction for shifting or adjusting the adjusting plates. The adjusting plates have a loose or sliding connection with the grooved heads of the link members, to which they connect to accommodate for the compression or expansion motion of the plates, as they are moved toward and from each other. Thus, the plates of one set are all moved in unison and at a corresponding rate with those of the second set, which likewise are moved in unison.

A pinion 54 is fixed upon the end of the screw shaft 50, meshing with a bevel gear 55, fixed upon a shaft 56, said shaft extending from the screw mechanism of one housing to the screw mechanism of the second housing, for simultaneously transmitting the screw shafts, respectively operating the adjusting plates at the opposite ends of the journals of the upper roll, in uniform degrees, thus maintaining the peripheral alignment of the roll for straight or uniform thickness rolling.

It is also possible to change the setting of the adjusting plates for one roll journal end relatively to the setting of the plates for the opposite journal end and maintain such degree of roll axis angularity with the adjustment of the plates for rolling work to a tapering form.

The shaft 56 has a gear 57 fixed thereon in mesh with a gear 58 fixed upon a second or counter shaft 59 suitably journaled in bearings upon the brackets 47 of the housings 1 and 2, said shaft extending parallel with and above the shaft 56, and has a hand-wheel 60 fixed upon one end thereof.

Upon rotating the hand-wheel 60, motion is imparted to the shaft 59, gears 58 and 57, and shaft 56, rotating the bevel gears 55 of the respective screw mechanism for each housing. The shaft 59 is provided with a rack gear 61 engaging with a vertically disposed rack bar 62 slidably mounted and guided within the frame extension 64 of the bracket 47. The rack bar, at its upper end, carries a pointer 65 adjustable thereon, movable with the rack bar and along the dial or scale plate 66, provided with suitable graduations or scale indications. The scale or dial plate 66 is rigidly fixed to the bracket 47 and at one side or edge longitudinally thereof is provided with a guide-way or T-groove 67 for receiving one or a plurality of pointers 68, 68, adjustably secured in said guide-way or groove and adapted to be set at various points along the scale, to which the movable pointer 65 may be adjusted. This provides definite, quickly legible, indicating points in making adjustments and coordinately indicating the amount of adjustment for degrees of roll separation and for various definite roll settings for successive work passes between the rolls, which is of considerable advantage in rolling mills where the work is repeatedly passed between the rolls of a single mill for roughing and finishing, requiring an adjustment of the rolls for each pass of the material between the rolls, to reduce the thickness of the work and accomplished to a degree of accuracy.

The indicating mechanism is also of advantage for initial, definite and micrometric adjustment or setting of the parts for obtaining a predetermined gauge of roll separation.

In the modification shown in Figs. 12-14 inclusive, the construction of the adjusting plates, movable abutment member and bearing block are substantially the same as those heretofore described and illustrated in Figs. 6-11 inclusive. The stationary abutment member, however, is not provided with the elongated hub 10. The housing, in the latter instance, is not provided with the enlarged counter-bore extending vertically therethrough, but merely with the bore to receive a bolt 70 having its head engaged in a socket formed in the stub hub portion of the stationary abutment member 9, for clamping or securing the abutment member 9 within the housing.

The depending limbs of the stationary abutment member 9 are of sectional form with the lower sections 71 thereof directly secured to the opening faces of the housing by means of screws 72, 72, as shown in Fig. 12. These limbs are recessed or gibbed into the opening walls of the housing, and, therefore, are rigidly held against lateral displacement.

The construction shown in Figs. 12-14 inclusive is preferably designed for new housings, while that shown in the previously described figures is capable of being applied within housings of mills in use.

In Figs. 15-16, a modification of dial indicating mechanism is disclosed, in which the shaft 59 carries a gear or pinion 73 in mesh with a gear 74 mounted upon the stub shaft 75 fixed to the bracket extension 76. 77 indicates a stationary dial fixed to the bracket extension 76, provided with a semicircular T-groove 79 along its periphery, in which the adjustable pointers 80 are mounted and secured. The hub 81 of the gear 74 carries a pointer 82, moving in an arc along the dial 77. This pointer is frictionally clamped upon the hub of the gear 74, so as to be adjustable thereon, to enable the pointer to be set with relation to the indicating dial for an accurate reading of the degrees of adjustment imparted to the screw shaft and their connected adjusting plates.

The gearing or transmitting ratios between the points and screw shaft for the adjusting plate is such as to magnify the caliper reading at the dial in both forms, so that the hand wheel can be operated with greater saving and rapidity for making each adjustment accurate, which is a valuable feature for some classes of work, although it is obvious that this may be readily modified to meet with different mill practices.

Having described my invention, I claim:

1. In a rolling mill, a pair of housings, a pair of rolls journaled in said housings, one of said rolls movable in said housings for roll separation, bearing and abutment means mounted in each of said housings for said movable roll, respectively comprising a bearing block guidingly supported with the housing engaging and moving with said roll, a stationary abutment member fixed within said housing, a movable abutment member intermediate said stationary abutment member and bearing block, and a plural series of tapering plates intervening said abutment member, and cooperating for moving said movable abutment member toward or from said stationary member.

2. In a rolling mill, a pair of housings, a pair of rolls journaled in said housings, one of said rolls movable in said housings for roll separation, abutment means mounted in each of said housings for said movable roll, respectively comprising a stationary abutment member, a movable abutment member and a plural series of tapering plates intervening said abutment member, and cooperating for moving said movable abutment member toward or from said stationary member.

3. In a rolling mill, a pair of housings, a pair of rolls journaled in said housings, one of said rolls movable in said housings for roll separation, bearing and abutment means mounted in each of said housings for said movable roll, respectively comprising a bearing block guidingly supported with the housing engaging and moving with said roll, a stationary abutment member fixed within said housing, a movable abutment member intermediate said stationary abutment member and bearing block, and a plural series of tapering plates intervening said abutment member with those of one series interlapped with those of a second cooperating for moving said movable abutment member toward or from said stationary member, and means for moving the plates of both series simultaneously toward and from each other.

4. In a rolling mill, a pair of housings, a pair of rolls journaled in said housings, one of said rolls movable in said housings for roll separation, extensible abutment means mounted within each of said housings, against which said movable roll bears for roll separation when the work is passed between the rolls, said abutment means comprising a pair of members, one fixed and the other movable, and tapering plates oppositely disposed and interlapped, intervening said members, and at their point of interlap providing a laminated wall aligned and parallel to the axis of said roll.

5. In a rolling mill, a pair of housings, a pair of rolls journaled in said housings, one of said rolls movable in said housings for roll separation, extensible abutment means mounted within each of said housings, against which said movable roll bears for roll separation when the work is passed between the rolls, said abutment means comprising a pair of members, one fixed and the other movable, and tapering plates oppositely disposed and interlapped, intervening said members, and at their point of interlap providing a laminated wall diametric with and longitudinal to the axis of said roll connecting said members.

6. In a rolling mill, a pair of housings, a pair of rolls journaled in said housings, one of said rolls movable in said housings for roll separation, extensible abutment means mounted within each of said housings, against which said movable roll bears for roll separation when the work is passed between the rolls, said abutment means comprising a pair of members, one fixed and the other movable, and tapering plates oppositely disposed and interlapped, intervening said members, and at their point of interlap providing a laminated wall diametric with and longitudinal to the axis of said roll connecting said members, and tension means for unitarily combining said members and plates.

7. In a rolling mill, a pair of housings, a pair of rolls journaled in said housings, one of said rolls movable in said housings for roll separation, extensible abutment means mounted within each of said housings, against which said movable roll bears for roll separation when the work is passed between the rolls, said abutment means comprising a pair of members, one fixed and the other movable, and tapering plates oppositely disposed and interlapped, intervening said members, and at their point of interlap providing a laminated wall diametric with and longitudinal to the axis of said roll connecting said members, tension means for unitarily combining said members and plates, and means for simultaneously adjusting said plates for changing the degree of roll separation.

8. In a rolling mill, a pair of housings, a pair of rolls journaled in said housings, one of said rolls movable in said housings for roll separation, extensible abutment means mounted within each of said housings against which said movable roll bears for roll limit of separation when the work is passed between the rolls, said means comprising a pair of members, one fixed within the housing and other movable therein, intermediate said roll and fixed abutment member, and tapering plates interposed between said member arranged in oppositely movable sets, the plates superposed and interlapped, combining at their points of interlap to provide a laminated central wall intervening and connecting said members, diametric with the axis of said roll.

9. In a rolling mill, a pair of housings, a pair of rolls journaled in said housings, one of said rolls movable in said housings for roll separation, extensible abutment means mounted within each of said housings, against which said movable roll bears for roll limit of separation when the work is passed between the rolls, said means comprising a pair of members, one fixed within the housing and the other movable therein intermediate said roll and fixed abutment member, and tapering plates interposed between said member, arranged in oppositely movable sets, the plates superposed and alternately interlapped, combining at their points of interlap to provide a laminated central wall intervening and connecting said members, diametric with the axis of said roll.

10. An extensible journal bearing, comprising a housing, a journal, a fixed and movable bearing member within said housing for said journal, and tapering plates interposed between said members arranged in oppositely movable sets, the plates superposed and interlapped, combining at their points of interlap to provide a laminated central wall intervening and connecting said members, diametric with the axis of said journal and means for simultaneously adjusting the opposing sets of plates, and the plates of a set unitarily.

11. In a rolling mill, a pair of housings, a pair of rolls journaled in said housings, one of said rolls movable in said housings for roll separation, extensible abutment means mounted within each of said housings against which said movable roll bears for roll limit of separation when the work is passed between the rolls, said means comprising a pair of members, one fixed within the housing and the other movable therein, intermediate said roll and fixed abutment member, and tapering plates interposed between said member arranged in oppositely movable sets, the plates superposed and interlapped, combining at their points of interlap to provide a laminated central wall intervening and connecting said members diametric with the axis of said roll, movable bearing members in said housings carried by said roll, adapted respectively to engage the extensible abutment means, and dash-pot means interposed between said bearing members and abutment means.

12. In a rolling mill, a pair of housings, a pair of rolls journaled in said housings, one of said rolls movable in said housing for roll separation, extensible abutment means mounted within each of said housings, against which said movable roll bears for roll limit of separation when the work is passed between the rolls, said means comprising a pair of members, one fixed within the housing and the other movable therein intermediate said roll and fixed abutment member, and tapering plates interposed between said member arranged in oppositely movable sets, the plates superposed and alternately interlapped, combining at their points of interlap to provide a laminated central wall intervening and connecting said members, diametric with the axis of said roll, and means respectively for each set of plates, engaging the plates at opposite sides thereof, for adjusting the plates of the set as a unit.

13. A journal bearing, comprising a housing, a journal, a fixed and a movable bearing member within said housing for said journal, and tapering plates interposed between said members arranged in opposite sets, movable transversely to a line longitudinal with the axis of the journal, the plates superposed and interlapped, combining at their points of interlap to provide a laminated central wall intervening and connecting said members diametric with the axis of said journal and means for simultaneously adjusting the opposing sets of plates, and the plates of a set unitarily.

14. A journal bearing, comprising a housing, a journal, a fixed and a movable bearing member within said housing for said journal, tapering plates interposed between said members arranged in opposite sets movable transversely to a line longitudinal with the axis of the journal, the plate superposed and interlapped, combining at their points of interlap to provide a laminated central wall intervening and connecting said members diametric with the axis of said journal, and means for yieldingly compressing said members and plates together and sustaining the same as a unit.

15. A journal bearing, a housing, a journal, an extensible bearing for said journal mounted within the housing, comprising a stationary member fixed within the housing, a movable member guidingly supported upon said stationary member, and tapering plates relatively oppositely arranged and superposed upon one another to provide a laminated central wall connecting said member, and adjustable for extending or contracting said members from and toward each other and means for adjusting the opposing plates simultaneously in opposing directions.

16. In a journal bearing, a housing, extensible bearing means, comprising a fixed and movable bearing member within the housing, tapering plates interposed between said members, arranged in opposing units of a plural number of plates to each unit and interlapped centrally of said member to provide a laminated wall connecting said member, transmitting means arranged at opposite sides of the plates of each unit engaging therewith for unitarily moving said plates to and from the plates of the opposite unit.

17. In a journal bearing, a housing, extensible bearing means, comprising a fixed and movable bearing member within the housing, tapering plates interposed between said members, arranged in opposing units of a plural number of plates to each unit and interlapped centrally of said member to provide a laminated wall connecting said member, said wall increasing in width as the plates of the opposing units are moved toward each other, transmitting means arranged at opposite sides of the plates of each unit engaging therewith for unitarily moving said plates to and from the plates of the opposite unit, and tension means for yieldingly compressing said members and plates together.

18. In a journal bearing, a housing, extensible bearing means, comprising a fixed and movable bearing member within the housing, tapering plates interposed between said members, arranged in opposing units of a plural number of plates to each unit and interlapped centrally of said member to provide a laminated wall connecting said member, said plates as units being movable toward and from each other transverse to the axis of the journal engaged in said housing, transmitting means arranged at opposite sides of the plates of each unit engaging therewith for unitarily moving said plates to and from the plates of the opposite unit.

19. In a journal bearing, a housing, extensible bearing means, comprising a fixed and movable bearing member within the housing, tapering plates interposed between said members, arranged in opposing units of a plural number of plates to each unit and interlapped centrally of said member to provide a laminated wall connecting said member, transmitting means arranged at opposite sides of the plates of each unit engaging therewith for unitarily moving said plates to and from the plates of the opposite unit, said plates slidably connecting with said transmitting means transversely to the transmitting motion of said means.

20. In a journal bearing, a housing, extensible bearing means, comprising a fixed and movable bearing member within the housing, tapering plates interposed between said members, arranged in opposing units of a plural number of plates to each unit and interlapped centrally of said member to provide a laminated wall connecting said member, a screw shaft for adjusting said plate units, and means connecting said screw and plate units at relatively opposite sides of said plates.

21. In a journal bearing, a housing, extensible bearing means, comprising a fixed and movable bearing member within the housing, tapering plates interposed between said members, arranged in opposing units of a plural number of plates to each unit and interlapped centrally of said member to provide a laminated wall connecting said member, a screw shaft for adjusting said plate units simultaneously in relatively opposite directions, links and nut means connecting said plate units and screw shaft at opposite sides of the plates, said plates transversely, slidably connecting with their respective links.

22. In a journal bearing, a housing, extensible bearing means, comprising a fixed and a movable member within the housing, tapering plates interposed between said members oppositely disposed, a screw shaft for oppositely adjusting said plates, transmission gearing for rotating said screw, an indicator transmitted by said transmission gearing, and dial in line with the movement of said indicator for indicating the degree of adjustment of said plates.

23. In a journal bearing, a housing, extensible bearing means, comprising a fixed and a movable member within the housing, tapering plates interposed between said member oppositely disposed, a screw shaft for oppositely adjusting said plate, transmission gearing for rotating said screw, an indicator transmitted by said transmission gearing, dial in line with the movement of said indicator, having graduations for indicating the degree of adjustment of said plates, and a pointer adjustably mounted on said dial along the graduations thereof.

In witness whereof, I hereunto subscribe my name, as attested by the two subscribing witnesses.

JOHN N. QUINN.

Witnesses:
L. A. BECK,
M. S. BARRON.